(12) United States Patent
Tso

(10) Patent No.: US 7,870,293 B2
(45) Date of Patent: Jan. 11, 2011

(54) HEADER-BASED NETWORK API

(75) Inventor: Michael M. Tso, Saratoga, CA (US)

(73) Assignee: Yahoo! Inc., Sunnyvale, CA (US)

( * ) Notice: Subject to any disclaimer, the term of this patent is extended or adjusted under 35 U.S.C. 154(b) by 503 days.

(21) Appl. No.: 10/077,834

(22) Filed: Feb. 15, 2002

(65) Prior Publication Data

US 2002/0124112 A1  Sep. 5, 2002

Related U.S. Application Data

(60) Provisional application No. 60/269,699, filed on Feb. 17, 2001.

(51) Int. Cl.
 *G06F 15/16* (2006.01)
(52) U.S. Cl. .................. 709/246; 709/202; 709/203; 709/229
(58) Field of Classification Search .......... 709/246, 709/202, 203, 229
See application file for complete search history.

(56) References Cited

U.S. PATENT DOCUMENTS

| | | | | |
|---|---|---|---|---|
| 5,550,803 | A * | 8/1996 | Crayford et al. | 370/246 |
| 5,611,049 | A | 3/1997 | Pitts | |
| 5,963,625 | A | 10/1999 | Kawecki et al. | |
| 6,049,821 | A * | 4/2000 | Theriault et al. | 709/203 |
| 6,085,234 | A | 7/2000 | Pitts et al. | |
| 6,266,681 | B1 * | 7/2001 | Guthrie | 715/501.1 |
| 6,343,323 | B1 * | 1/2002 | Kalpio et al. | 709/229 |
| 6,463,474 | B1 * | 10/2002 | Fuh et al. | 709/225 |
| 6,606,663 | B1 * | 8/2003 | Liao et al. | 709/229 |
| 6,873,691 | B1 | 3/2005 | Malik | |
| 7,146,505 | B1 * | 12/2006 | Harada et al. | 713/185 |
| 7,203,315 | B1 * | 4/2007 | Livesay | 380/255 |
| 2002/0038363 | A1 * | 3/2002 | MacLean | 709/224 |
| 2002/0091757 | A1 * | 7/2002 | Cuomo et al. | 709/203 |
| 2002/0124055 | A1 * | 9/2002 | Reisman | 709/218 |
| 2002/0138331 | A1 * | 9/2002 | Hosea et al. | 705/10 |

FOREIGN PATENT DOCUMENTS

| | | |
|---|---|---|
| EP | 0 511 926 A1 | 11/1992 |
| WO | WO 97/00471 A2 | 1/1997 |
| WO | WO 00/46963 A1 | 8/2000 |
| WO | WO 00/79434 A1 | 12/2000 |

OTHER PUBLICATIONS

Meyer, Jorg. "How to Manage, Negotiate, and Transfer Personal Information on the Web." Apr. 9, 1999. IBM Corporation Almaden Research Center Publications. pp. 1-126. Retrieved from http://www.almaden.ibm.com/cs/wbi/papers/p3p/.*

Barret, R. "Intermediaries: An Approach to Manipulating Information Streams." Nov. 4, 1999. IBM Systems Journals, vol. 38, No. 4. pp. 629-641. Retrieved from http://www.research.ibm.com/journal/sj/384/barrett.html.*

* cited by examiner

*Primary Examiner*—Larry Donaghue
*Assistant Examiner*—Nicholas Taylor
(74) *Attorney, Agent, or Firm*—Hickman Palermo Truong & Becker LLP; Brian D. Hickman

(57) ABSTRACT

A method and apparatus for communicating with entities outside of a secure network by intercepting and modifying messages is provided. Techniques for accomplishing the communication include inserting, retrieving, and deleting information from messages. The entities involved in the communication include, but are not limited to, users, content providers, and access providers. Furthermore, the types of information used in modifying messages include billing, location, demographic information, profile data, multimedia data, and code.

46 Claims, 9 Drawing Sheets

HEADER-BASED NETWORK API

PRIORITY CLAIM AND CROSS-REFERENCE TO RELATED APPLICATIONS

This application is related to and claims domestic priority from prior U.S. Provisional Application Ser. No. 60/269,699, filed on Feb. 17, 2001 entitled "Content-Based Billing and Header Based Network API", by Michael M. Tso, Pei-Yuan Zhou, Ivry Semel, Sailendrak Padala, and Philippe Le Rohelec, the entire disclosure of which is hereby incorporated by reference as if fully set forth herein.

FIELD OF THE INVENTION

The present invention relates to network communications, and more specifically, to using an intermediary to intercept and modify messages between participants.

BACKGROUND OF THE INVENTION

The Internet is a network composed of many smaller private networks. Frequently, parties that are outside a particular private network would like to have access to information maintained securely within that particular private network. For example, content providers would often like to access information possessed by access providers. The information maintained by an access provider to which content providers may want access may include, for example, the current location of a mobile device user, the billing information of a user, demographic information about the user, etc. In general, this information is maintained secure within the access provider's private network.

There are two general approaches for making information maintained securely within a private network available to third parties that are authorized to use it. The first approach is to execute the third party's application within the private network. For example, an access provider could host, within access provider's own network, the applications of content providers (hereinafter referred to as "content provider applications").

FIG. 1 shows a system in which a content provider application 103 is executed within the private network 100, which is a secure network containing information the access provider controls. Referring to FIG. 1, the user 101 requests information 104 from content provider application 103. To satisfy user 101's request, the content provider application 103 retrieves information 104 where the content provider application 103 and the information 104 reside inside the secure network 100. Then the content provider application 103 provides the requested information 104 to user 101.

The approach of hosting the content provider applications within the private network of the access provider does not scale well, since the more third party applications that the access provider executes within its network, the greater the likelihood that the applications will conflict with each other, or with other programs within the access provider's network. The overall reliability and integrity of the network is affected as a result.

The second approach is for the access provider to provide each content server with a mechanism, such as a program (hereinafter referred to as "access provider program"), an encryption key, or encryption password that enables each content server to access the appropriate information using often proprietary interfaces as well as traversing through the access provider's firewall. FIG. 2 is a block diagram of a system in which a user 201 requests content from a content provider, which the content provider application 203 is associated with. As a result of the user 201's request, the content provider application 203 accesses information 204 from network 200, which is a secure network containing information the access provider controls, using an access provider program 205. The content provider application 203 requests information 204 from the access provider program 205. The access provider program 205 retrieves the information 204 from inside the secure network 200. Then the access provider program 205 provides the retrieved information 204 to the content provider application 203. Then the content provider application 203 provides the information 204 to user 201.

The approach of providing access provider programs to content providers is undesirable due to the security threat raised by providing a tunnel through the firewall's security. Malicious parties could study how the access provider software is getting around the firewall, and create their own programs to do the same. There is also a problem with supporting and maintaining a piece of code distributed to potentially thousands of content providers. The proprietary interfaces to the private network's systems may change over time which would require updating and integration testing of the access provider software.

Another negative aspect of accessing information in a secure network associated with an access provider either with an access provider program or a content provider application is the time that is required for a content provider to prepare a legal contract (e.g., "commercial terms of agreement") when offering a new service. As a part of this contractual agreement, the access provider needs to maintain and check a database of pre-configured entries for each content provider that the access provider is associated with.

Based on the foregoing, it is clearly desirable to provide techniques that allow authorized third parties to access confidential data maintained by within a private network, without threatening the security of the data, nor requiring the controller of that network to host third party applications.

SUMMARY OF THE INVENTION

Techniques are provided for communicating with entities outside of a secure network by using an intermediary to intercept, modify, and forward messages that are being sent to those entities. The intermediary intercepts the messages and may insert, retrieve, and/or delete information from messages. According to one aspect of the invention, the modifications are made in such a way that a recipient that is not expecting the modifications made by the intermediary will still successfully receive the information from the original message. For example, in one embodiment, the intermediary inserts the information into the headers of the messages in a way that will be ignored by recipients that are not expecting the information.

The entities involved in the communication may include but are not limited to users, content providers, and access providers. The types of information that the intermediary adds to the intercepted messages will vary from implementation to implementation, and may include billing, location, demographic information, profile data, multimedia data, and software programs.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

A method and apparatus are described for communicating with entities outside of a secure network by intercepting and modifying messages. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Concerning Notation In The Figures

As access providers, content providers, and users communicate information between each other, data is copied. As a matter of notation in the figures, the first copy of data will be indicated with a prime symbol and a second copy will be indicated with a double prime symbol. For example, if the original copy of data is indicated with the letter A, then the first copy of A will be A', and the second copy of A will be A".

FUNCTIONAL OVERVIEW

Most network communications protocols use messages that have headers. Typically, a message header has information necessary to make sure the message is delivered to the correct destination. It may also include optional information, such as data that identifies the source of the message.

According to one aspect of the invention, information from a private network is conveyed to authorized parties outside the network by inserting the information into the header of messages that are directed to those parties, using optional fields in the header so as to ensure correct delivery and handling of the message by intermediaries or destinations which may not be able to decode the information that has been inserted into the optional fields.

Figure 1:
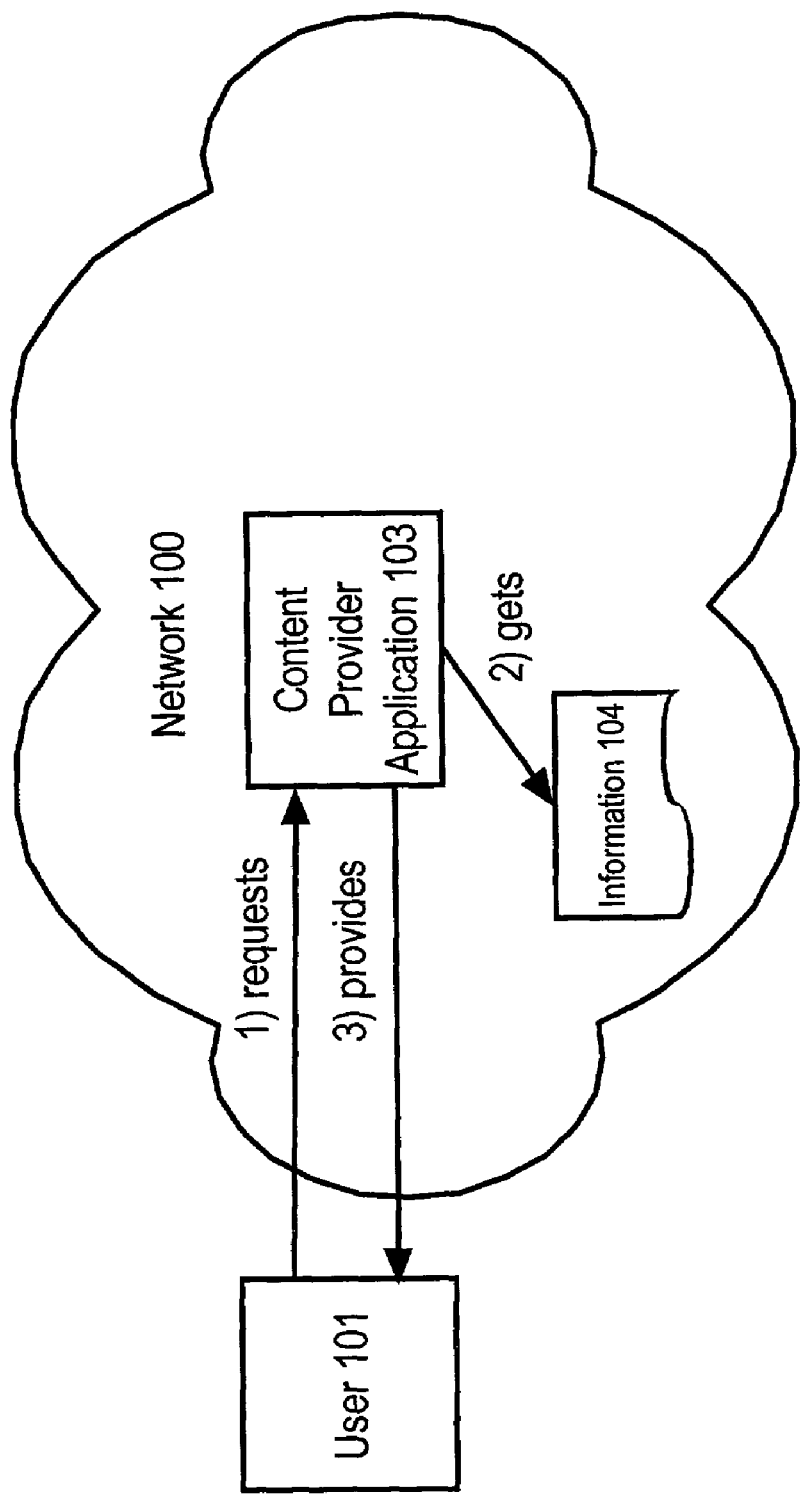
FIG. 1 is a block diagram of a system in which an access provider hosts content provider applications.
Figure 2:
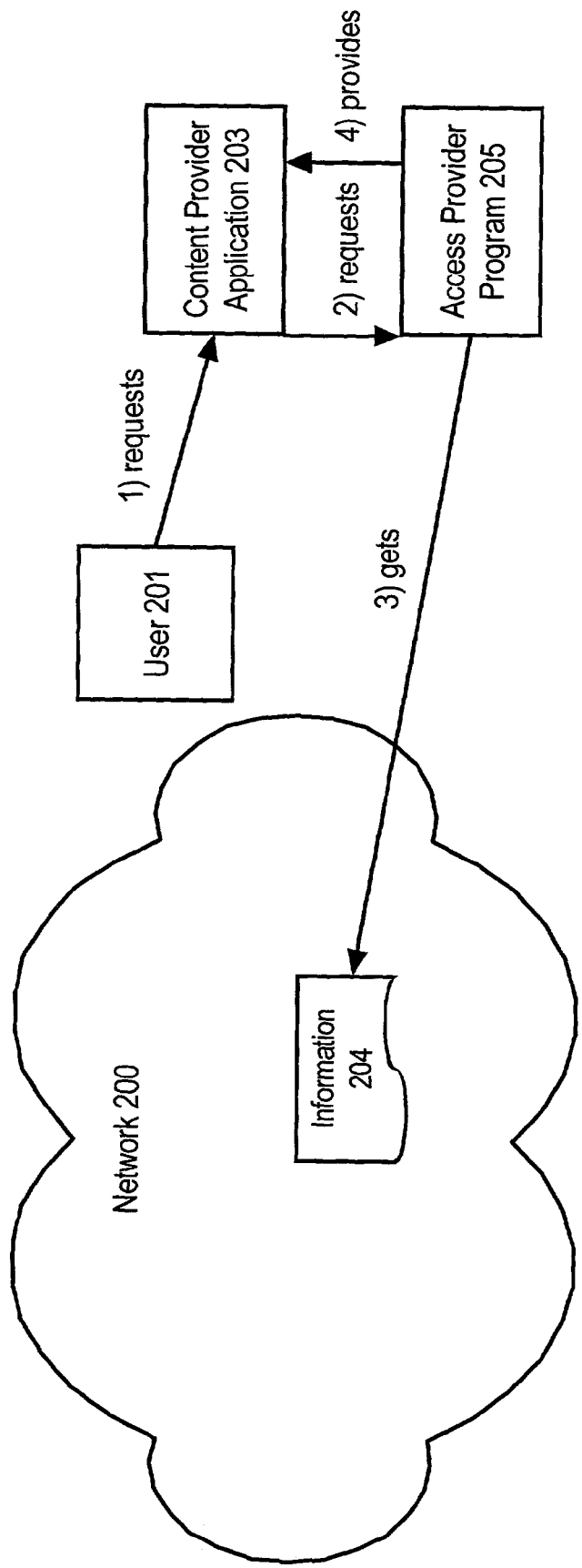
FIG. 2 is a block diagram of a system in which an access provider provides a program by which content providers can access information maintained by the access provider.
Figure 3:
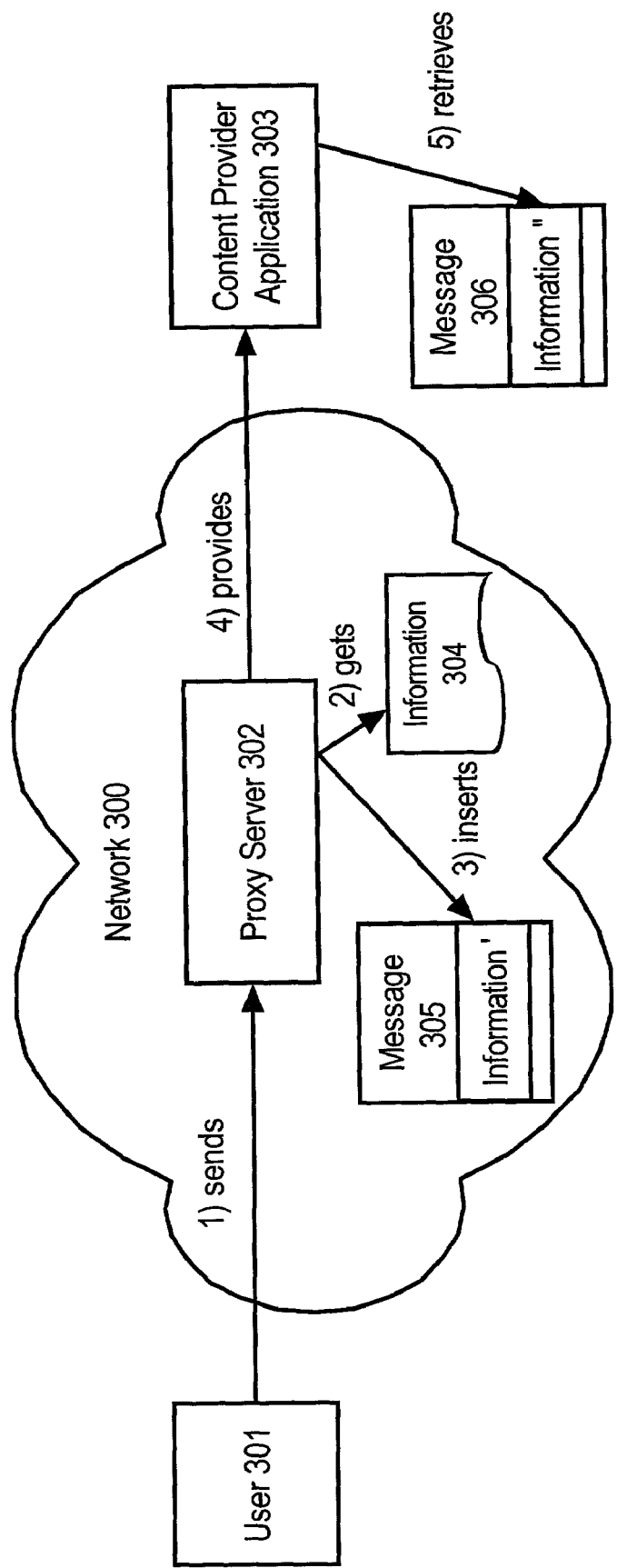
FIG. 3 is a block diagram of a system in which an access provider intercepts a user's request and piggybacks information for the content provider on the message containing the user's request, according to an embodiment of the invention.

Specifically, HTTP is the protocol used for most Internet application traffic. The HTTP protocol specifies the transmission of information in blocks that have headers. According to one embodiment as depicted in FIG. 3, when a user 301 sends a message 305 to a content provider application 303, the message 305 is intercepted by the proxy server 302 and, depending on the destination of the message 305, information 304 that is otherwise only available within the private network 300 of the proxy server 302 is inserted into the HTTP header of the message 305. Information 304 becomes information' when inserted into the HTTP header of message 305. Message 305 and information' become message 306 and information" when transmitted over the network. The content provider application 303 retrieves the information" from the header of message 306 when the content server receives the message 306.

Although FIG. 3 depicts the network intermediary as a proxy server, any network intermediary capable of intercepting and augmenting messages reliably, such as routers, switches, and load balancers, may be used. Furthermore, HTTP is not the only protocol that may be used. Therefore, any email protocol and packet data may be used, in which case the message body would be the data payload.

According to one embodiment, the information that the access server inserts into the message header relates to the user sending the message. For example, the information may indicate the current location of the user of a mobile device, or information from the user profile of the user.

The HTTP protocol allows optional application defined fields to be added to the header. Furthermore the HTTP protocol defines that intermediaries and destinations may simply pass any header fields that the intermediaries or destinations cannot comprehend without affecting the integrity of the data or the connection. If a protocol other than HTTP is used, and that other protocol does not support optional application defined fields, then a tunnel must be established between the access provider and the content provider. The tunnel will ensure that the intermediaries (such as routers and proxies) between the access provider and the content provider will correctly deliver the original message as well as the new data fields that have been inserted. Tunneling data by encapsulating one data format, for example with optional fields, in another data format is well known to those skilled in network protocol design.

PROVIDING INFORMATION FROM A PRIVATE NETWORK

Figure 4:
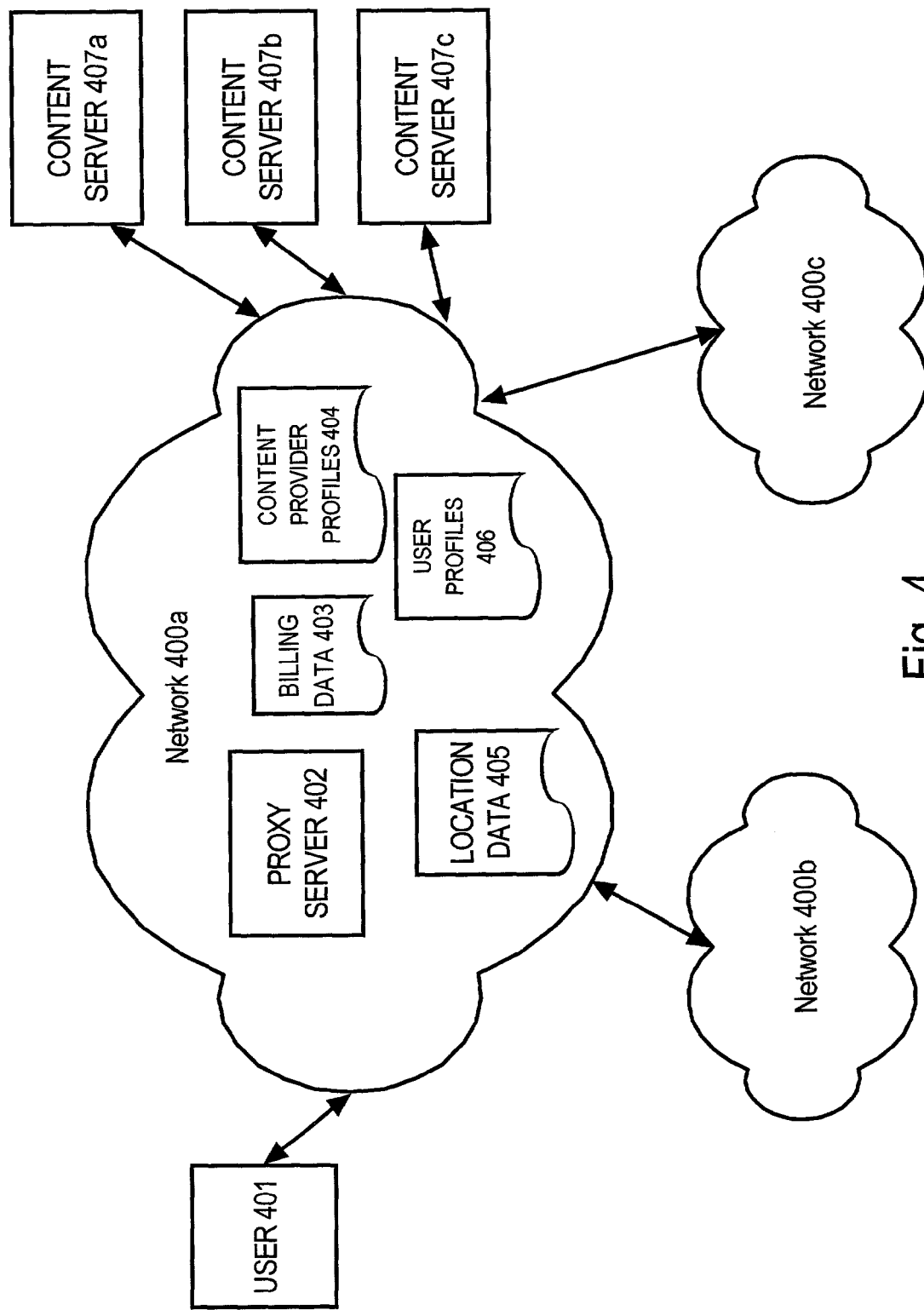
FIG. 4 is a block diagram of a system in which information from within a network is provided to parties outside the network using the headers of messages that are being sent to those parties, according to an embodiment of the invention.

FIG. 4 is a block diagram of a system in which information from within a network is provided to parties outside the network using the headers of messages that are being sent to those parties. Referring to FIG. 4, a user 401 accesses content and services from content servers (407a, 407b, 407c) through a proxy server 402 on a network 400a controlled by an access provider.

Various items of information are maintained within that network 400a, including location data 405, billing data 403, user profiles 406, and content provider profiles 404. Since information such as 403, 404, 405, and 406 are maintained inside network 400a, which is associated with an access provider, networks 400b and 400c do not have access to information 403, 404, 406 and 406. Some of the services from the content servers (407a, 407b, 407c) that are external to network 400a may desire access to some of that information. For example, a restaurant locator site, which is associated with content servers such as 407a, 407b, and 407c, may want access to a user's location data 405 in order to determine the closest restaurants to the user 401's location.

As another example, a content provider that charges a per-access fee may desire access to the billing data so that the content provider can post charges in the billing data that will be billed on the invoices generated by the access provider. This avoids the need for the content provider to send out its own bills, and would be particularly useful when the amount billed by the content provider is low relative to the cost of preparing a bill.

A typical scenario could proceed as follows:

The proxy server intercepts a user request for a service associated with a URL.

The proxy server inspects content provider profiles to determine the needs of the content provider/service associated with that URL. The destination address of the URL is used to identify the content provider.

The proxy server determines that the requested service requires the user's current location information.

The proxy server obtains the user's current location data and inserts the location data into the header of the intercepted request.

The proxy server then transmits the modified request to the content provider.

PROVIDING INFORMATION TO A PRIVATE NETWORK

Just as message headers may be used to carry data out of a private network, they may be used by third parties to provide data to a private network. For example, assume that a particular content provider charges different fees for accessing different content on its service. If the fee schedule for the particular content provider is maintained in a content provider profile within the private network, then the content provider profile for the content provider that is maintained by every access server has to be updated every time the fees change. On the other hand, the content provider may simply dynamically insert the current fee for accessing particular content into the message header of a message that delivers that particular content.

For example, assume that a content provider charges 5 cents for each stock quote, and the charge is to be billed by the access provider. Rather than maintain data indicating the 5 cent fee in the content provider profile, the content server may insert the fee amount in the header of each message that delivers a stock quote. Consequently, if the content provider decides to increase the fee to 7 cents, the content provider merely changes the data that determines the value inserted into the header. The access provider need not make any change to the content provider profile. Another example of when the header based network API would be advantageous is when there is a large number of items with different prices (such as software programs for downloading, grocery items, etc.). Maintaining a large number of items at the access provider would be a big task since maintaining these items entails updating the prices of the items as the prices fluctuate.

A typical scenario could proceed as follows:

The proxy server intercepts a request for a service provided by a content provider.

The request is forwarded to the content provider.

The content provider replies with a message that, within its header, indicates a particular fee for the service.

The proxy server intercepts the reply from the content provider.

The proxy server verifies that the content provider is an approved partner.

The proxy server checks the user profile to determine whether the user has sufficient funds, and whether the user is authorized to make such purchases.

The proxy server sends a message to the user requesting authorization of payment. Payment authorization may be bypassed if the user so indicates.

The proxy server receives authorization of payment from user.

The proxy server deducts the fee from the user's balance and forwards the content to the user.

Security Issues

Under various circumstances, such as when a user is charged a fee from a third party, it is critical to authenticate the identity of the parties involved. The user is typically authenticated at the time the user starts a session by requiring the user to login with a valid user ID/password combination.

The third-party content provider may be authenticated, in turn, prior to completion of the transaction. For example, when the proxy server intercepts a request for a service, the proxy server may inspect the content provider profile to determine whether the service involves a fee. If it does, the proxy server may establish a secure connection with the content provider, and authenticate the content provider through any number of authentication mechanisms, such as through the use of digital certificates.

Piggybacked Conversation

As explained above, access providers can communicate information to content servers by inserting information into the header of messages, initiated by users, that are destined for the content servers as is depicted in FIG. 3. Likewise, content providers can communicate information to access providers by inserting information into the header of responses to those messages. Thus, by inserting data into message headers, an access provider and a content provider can effectively carry on a conversation that is piggybacked on the messages of users that are accessing the services of the content provider. Within such piggybacked conversations, the parties to the piggybacked conversation can authenticate each other, request information and respond to requests.

For example, assume that the access provider receives from a user a request for a service that is provided by a content provider about which it has no information. The access provider may simply forward the request to the content provider without inserting any information. The content provider may insert into the message header of the reply a request for location information.

When the access provider intercepts the message from the content provider, the access provider sees the request for location information. Rather than deliver the reply to the user, the proxy server may send a new request to the content server, where the header of the new request includes location information. The content server then responds with content that is based upon the location information, which the proxy server sends on to the user. Thus, the proxy answered the content server's need for information that the content server had requested from the user, thereby avoiding the need for the user to provide the information and also avoiding the need for a pre-configured entry in the access provider's database for this particular content provider. An intermediary, such as a proxy, provides a secure as well as easy mechanism for content providers to access information and offer new services without having to update commercial terms of agreement in the form of legal contracts. Therefore, the relationship for exchanging information can be established dynamically and instantly.

Figure 5:
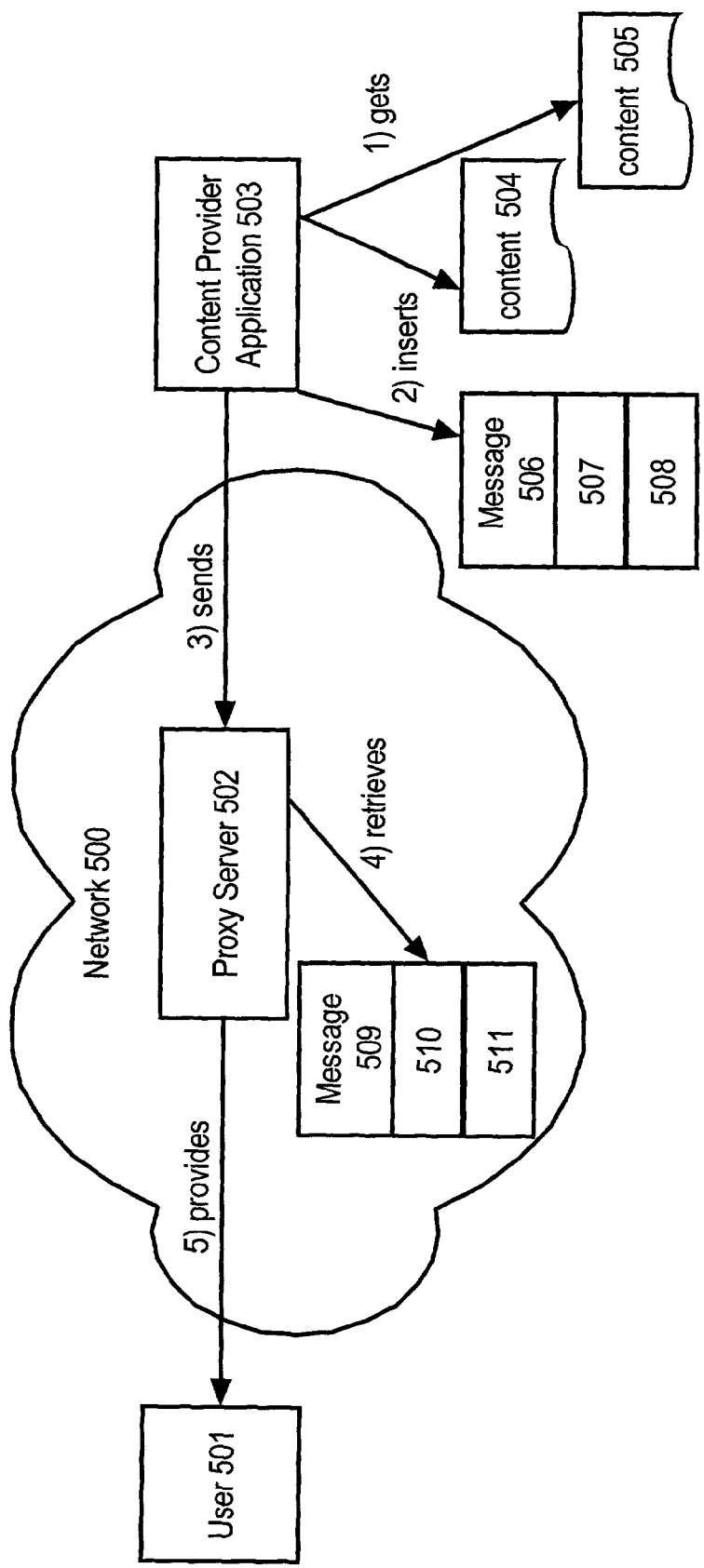
FIG. 5 is a block diagram of the content provider piggybacking information on a message containing a response to a user request, according to an embodiment of the invention.

FIG. 5 is a block diagram of a system in which a content provider communicates with both the access provider via a proxy server and a user. Referring to FIG. 5, the content provider application 503 prepares a message 506 that includes content 504 for the user 501 and content 505 for an access provider via proxy server 502. The content provider application 503 retrieves contents 504 and 505. The content 504, which the user 501 desires, is placed the body 508 of message 506. The content 505, which the proxy server 502 desires, is placed in the message header 507 of message 506. When the message 506 is transmitted over the network 500, message 506 becomes message 509, content 507 becomes 510, and content 508 becomes 511. The proxy server 502 intercepts message 509 and retrieves content 510 from the header of message 509. Then the content 511 is provided to user 501. Thus, within the same message, the content provider communicates some information to the user, and some (potentially unrelated) information to the access provider.

Figure 6A:
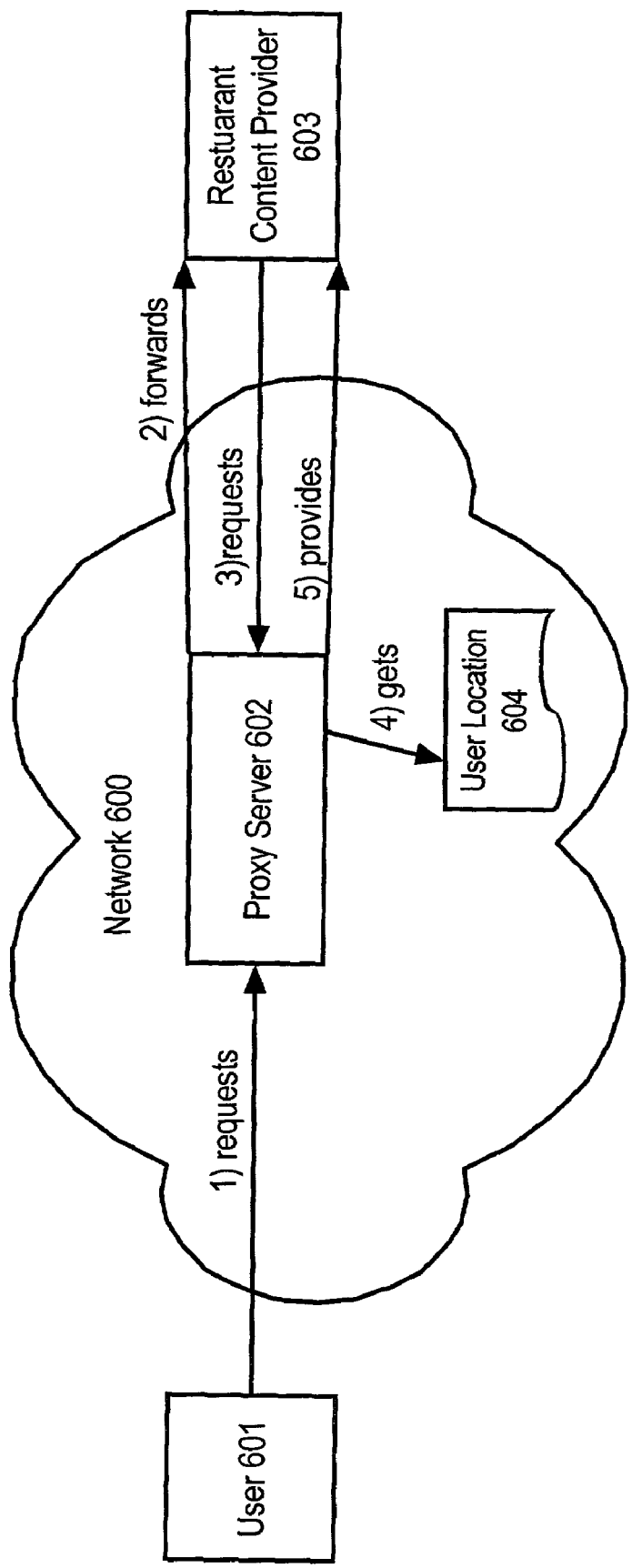
FIGS. 6a and 6b are block diagrams that illustrate a piggybacked conversation in detail.
Figure 6B:
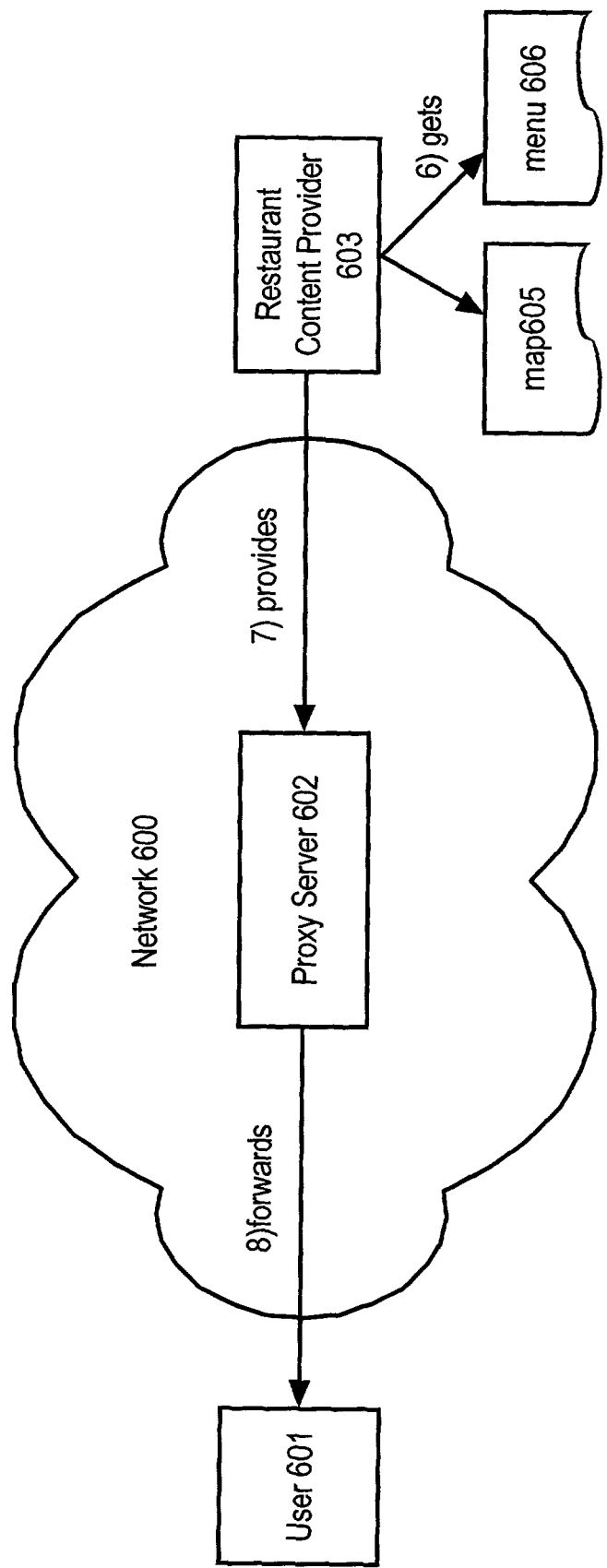

FIGS. 6a and 6b depict a scenario of the communication exchange involving a user, access provider via a proxy server and a content provider for a restaurant (hereinafter referred to as Restaurant content provider) using the piggybacked conversation technique. The scenario is as follows:

1) The user 601 sends message A, requesting a menu and a map, to a restaurant that is represented by the restaurant content provider 603;

2) The proxy server 602 intercepts message A, which contains the user's request, and forwards message A to the restaurant content provider 603;

3) The restaurant content provider determines that to best service this request the restaurant content provider 603 should obtain information about the user 601's location for constructing map/directions. Therefore, the restaurant content provider creates message B in order to request user location from the user 601, inserts an indication that the restaurant content provider 603 needs the location of user 601 into the header of message B and transmits message B over network 600.

4) The proxy server 602 intercepts message B, which contains the request from the restaurant content provider 603, examines the header of message B and sees the request for user 601's location. The proxy server 602 retrieves the user location 604 from within the secure network 600. Optionally, the proxy server 602 may first ask permission from the user 601 or check in a user profile (refer to 406) or a content provider profile (refer to 404) to ensure that the content provider 603 has permission to access the location information 604. Note, the user profile 406 and the content provider profile 404 can be implemented as databases.

5) The proxy server 602 creates message C, inserts the user location 604 information into message C, and provides the user location 604 to the restaurant content provider 603 via message C;

6) The restaurant content provider 603 retrieves the user location information 603 from message C. Now that the restaurant content provider 603 has received the user location 604 information, the restaurant content provider 603 generates a map/directions 605 for the user and retrieves the menu 606;

7) The restaurant content provider 603 creates message D, which contains the menu 606, map/directions 605, and transmits provides message D over the network.

8) The proxy server 602 intercepts message D and does the following with message D:
   a) examines the header of message D;
   b) sees there is nothing pertinent in the header of message D; and
   c) forwards message D to user 601.

Optionally, the access provider may also create a content provider profile for the content provider, and indicate within the profile that the content provider desires location information. By inspecting content provider profile, the access provider knows that the service provided by the content provider requires location information. Using this knowledge, the access provider can then proactively insert location information into any subsequent messages that its users send to that content provider, without the content server having to request the location information.

Figure 7:
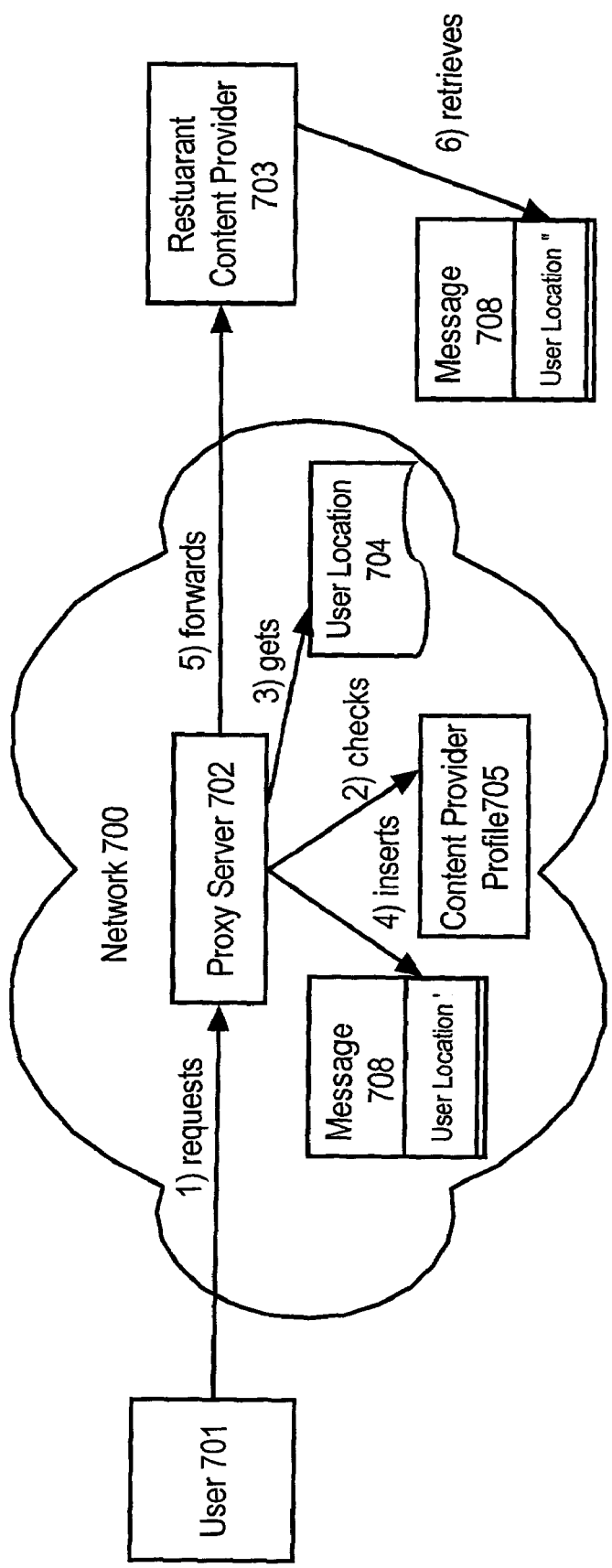
FIG. 7 is a block diagram that illustrates a piggybacked conversation where the access provider checks the content provider's profile, according to an embodiment of the invention.

FIG. 7 depicts a scenario that is similar to FIGS. 6a and 6b except that the proxy server 702 checks a content provider profile 705 for policy information from the content provider application 703 before forwarding the user 701's request to the content provider application 703. As depicted in FIG. 7, the user 701 sends a request for information from the restaurant content provider 703 via message 706. When the proxy server 702 intercepts message 706, the proxy server 702 checks the content provider profile 705 and sees that the content provider profile 705 indicates that the user location 704, which is the location of user 701, should be inserted into messages before forwarding the messages to the restaurant content provider 703. Therefore, the proxy server 702 retrieves the user location 704 and inserts the user location 704 into the header of message 706 and forwards the message 706, which includes the inserted user location', to the restaurant content provider 703. When the restaurant content provider 703 receives the message, the restaurant content provider 703 retrieves the user location' from the header of message 708.

Alternatives

There is no limit to the type of content that can be transmitted in the piggybacked conversations described above. For example, one participant in the conversation may insert JAVA code into the header for the other participant to execute. Similarly, the inserted data may include multimedia, such a digital video, images, or sound clips. Since the piggybacked conversation takes place transparent to the user, the contents of the piggybacked conversation are typically not presented to the user. Thus, the proxy server may delete the additional information from the headers of messages received from content providers prior to delivering the messages to the users.

In the description given above, the conversation between the proxy server and the third party is piggybacked on the conversation between the user and the third party using the header of the user's messages. However, in alternative embodiments, the conversation is piggybacked by inserting information into portions of the messages other than the header. Within the HTTP context, inserting the data into the header is preferred because recipients and intermediaries that do not have support for such piggybacked conversations simply ignore the inserted fields in the header without causing errors. An example of inserting fields into content is using user invisible fields in HTML, such as the Abstract field. Information can be inserted into invisible fields in the message header or invisible fields on the content or data portion of the message. The proxy server is an intermediary that enables network intelligence to be added to requests and responses without having to extensively change the software infrastructure between the client and the server.

Hardware Overview

Figure 8:
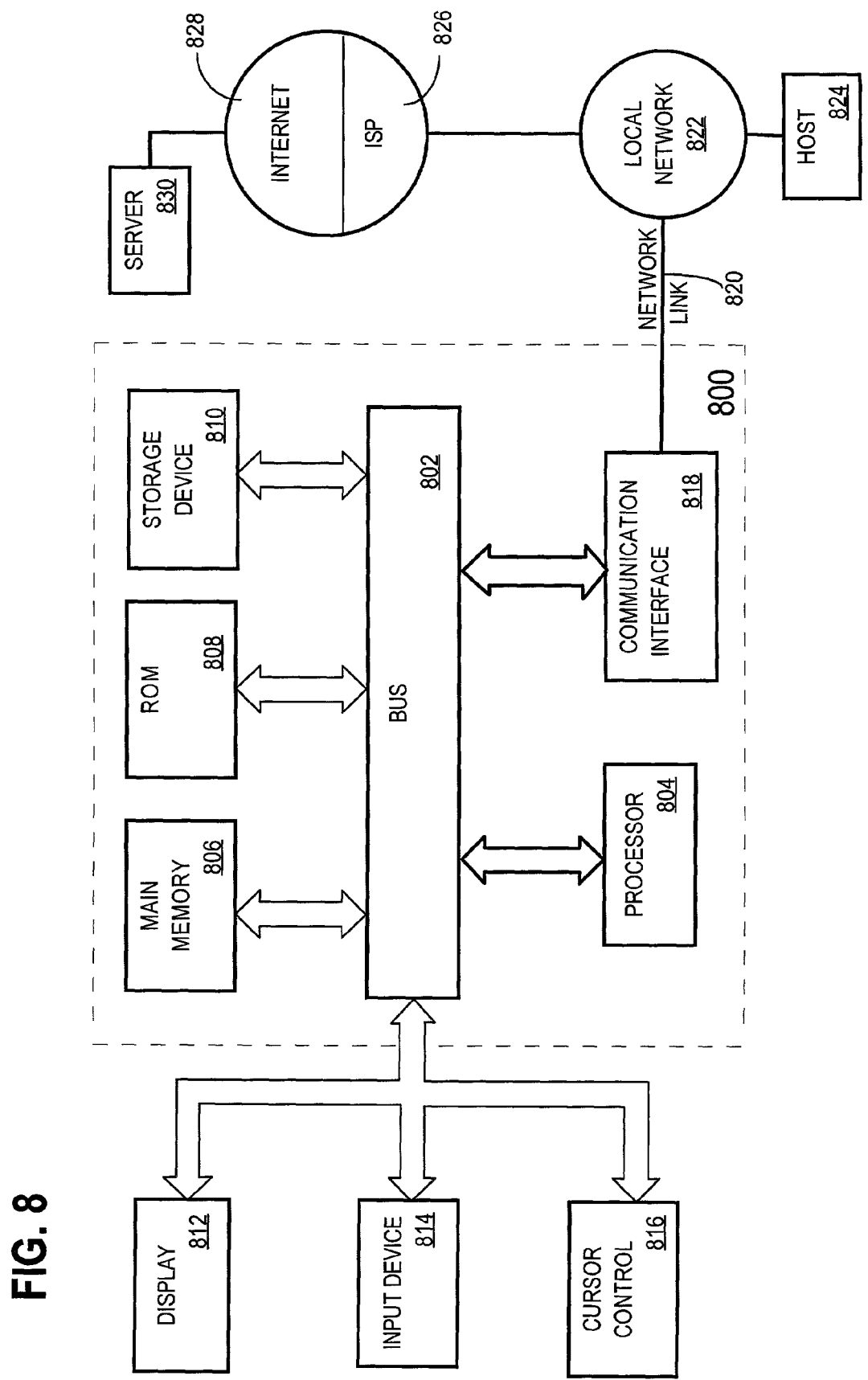
FIG. 8 is a block diagram of a computer system on which embodiments of the invention may be implemented.

FIG. 8 is a block diagram that illustrates a computer system 800 upon which an embodiment of the invention may be implemented. Computer system 800 includes a bus 802 or other communication mechanism for communicating information, and a processor 804 coupled with bus 802 for processing information. Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

The invention is related to the use of computer system 800 for implementing the techniques described herein. According to one embodiment of the invention, those techniques are performed by computer system 800 in response to processor 804 executing one or more sequences of one or more instructions contained in main memory 806. Such instructions may be read into main memory 806 from another computer-readable medium, such as storage device 810. Execution of the sequences of instructions contained in main memory 806 causes processor 804 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 804 for execution. Such a medium may take many forms, including but not limited to, non-volatile media, volatile media, and transmission media. Non-volatile media includes, for example, optical or magnetic disks, such as storage device 810. Volatile media includes dynamic memory, such as main memory 806. Transmission media includes coaxial cables, copper wire and fiber optics, including the wires that comprise bus 802. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 804 for execution. For example, the instructions may initially be carried on a magnetic disk of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are exemplary forms of carrier waves transporting the information.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution. In this manner, computer system 800 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for communicating electronic information comprising the computer-implemented steps of:

intercepting, at an intermediary that has access to information about a service requestor, a message sent from the service requestor to a service provider;

wherein the information about the service requestor to which the intermediary has access includes first data about the service requestor and second data about the service requestor;

wherein the first data conveys different information about the service requestor than the information about the service requestor that is conveyed by the second data;

without requiring communication from the service provider, the intermediary performing the following steps in response to intercepting the message:

reading information contained in the message;

based on the information contained in the message, determining what type of information is required by a service requested by the service requestor;

selecting additional information to convey to the service provider based on the type of information required by the service, as determined from the information that was read from the message;

responsive to the service requested by the service requestor being a first service, selecting the first data but not the second data as the additional information to convey to the service provider;

responsive to the service requested by the service requestor being a second service, selecting the second data but not the first data as the additional information to convey to the service provider;

modifying the message to create a modified message that includes the additional information; and transmitting the modified message for receipt by the service provider;

wherein the method is performed by one or more computing devices.

2. A non-transitory computer-readable storage storing instructions, the instructions including instructions which, when executed by one or more processors cause:

intercepting, at an intermediary that has access to information about a service requestor, a message sent from the service requestor to a service provider;

wherein the information about the service requestor to which the intermediary has access includes first data about the service requestor and second data about the service requestor;

wherein the first data conveys different information about the service requestor than the information about the service requestor that is conveyed by the second data;

without requiring communication from the service provider, the intermediary performing the following steps in response to intercepting the message:

reading information contained in the message;

based on the information contained in the message, determining what type of information is required by a service requested by the service requestor;

selecting additional information to convey to the service provider based on the type of information required by the service, as determined from the information that was read from the message;

responsive to the service requested by the service requestor being a first service, selecting the first data but not the second data as the additional information to convey to the service provider;

responsive to the service requested by the service requestor being a second service, selecting the second data but not the first data as the additional information to convey to the service provider;

modifying the message to create a modified message that includes the additional information; and transmitting the modified message for receipt by the service provider.

3. A system comprising:

an intermediary, having one or more processors, communicatively coupled between a service requestor and a service provider through which a message between the service requestor and the service provider passes;

the intermediary being configured to have access to information about the service requestor, wherein the information about the service requestor to which the intermediary has access includes first data about the service requestor and second data about the service requestor, wherein the first data conveys different information about the service requestor than the information about the service requestor that is conveyed by second data;

the intermediary being configured to intercept, at an intermediary, a message sent from a service requestor to a service provider;

the intermediary being configured to, without requiring communication from the service provider:

read information contained in the message;

based on the information contained in the message, determine what type of information is required by a service requested by the service requestor;

select additional information to convey to the service provider based on the type of information required by the service, as determined from the information that was read from the message; and responsive to the service requested by the service request or being a first service,selecting the first data but not the second data as the additional information to convey to the service provider;

responsive to the service requested by the service requestor being a second service, selecting the second data but not the first data as the additional information to convey to the service provider;

modify the message to create a modified message that includes the additional information; and transmit the message.

4. The method for claim 1 wherein said type of information required by said service includes information that is not already present in said message, about said service requestor.

5. The method for claim 1 wherein said type of information required by said service is a current location of said service requestor.

6. The method for claim 1 wherein the step of selecting additional information to convey further includes the steps of:

locating a profile based on information contained in said message; and obtaining the additional information based on information contained in said profile.

7. The method of claim 6 wherein:

the profile is associated with the service requestor; and the step of locating the profile includes locating the profile based on information within said message that identifies the service requestor.

8. The method of claim 6 wherein:

the profile is associated with the service provider; and the step of locating the profile includes locating the profile based on information within said message that identifies the service provider.

9. The method for claim 6 wherein the profile contains information concerning where to obtain the additional information.

10. The method for claim 6 wherein the profile includes authentication information.

11. The method for claim 1 wherein the step of modifying said message further includes the step of inserting the additional information into a header of the message.

12. The method for claim 11 wherein the step of inserting the additional information into the header of the message includes the step of inserting the additional information into one or more invisible fields, which may optionally be ignored by the service provider, within the header.

13. The method for claim 1 wherein the step of modifying said message further includes the step of inserting the additional information into a data portion of the message.

14. The method for claim 13 wherein the step of inserting the additional information into the data portion of the message includes the step of inserting the additional information into one or more invisible fields, which may optionally be ignored by the service provider, in the data portion of the message.

15. The method for claim 1 wherein the additional information is a request for a second set of additional information.

16. The method for claim 1 wherein the additional information is a current location of the service requestor.

17. The method for claim 1 wherein the information contained in said message that is used for determining said additional information is the destination of the message.

18. The method for claim 1 further comprising the step of obtaining the additional information from within a private network that is not accessible to said service provider.

19. The method for claim 1 wherein the additional information is code for execution by said service provider.

20. The method for claim 1 wherein the additional information is billing data.

21. The method for claim 1 further comprising the computer-implemented step of authenticating the service provider.

22. The method for claim 21 wherein the step of authenticating further includes the step of determining whether the service provider is an approved partner.

23. The computer-readable storage for claim 2 wherein said type of information required by said service includes information that is not already present in said message, about said service requestor.

24. The computer-readable storage for claim 2 wherein said type of information required by said service is a current location of said service requestor.

25. The computer-readable storage for claim 2 wherein the step of selecting additional information to convey further includes the steps of:
  locating a profile based on information contained in said message; and
  obtaining the additional information based on information contained in said profile.

26. The computer-readable storage of claim 25 wherein:
  the profile is associated with the service requestor; and
  the step of locating the profile includes locating the profile based on information within said message that identifies the service requestor.

27. The computer-readable storage of claim 25 wherein:
  the profile is associated with the service provider; and
  the step of locating the profile includes locating the profile based on information within said message that identifies the service provider.

28. The computer-readable storage for claim 25 wherein the profile contains information concerning where to obtain the additional information.

29. The computer-readable storage for claim 25 wherein the profile includes authentication information.

30. The computer-readable storage for claim 2 wherein the step of modifying said message further includes the step of inserting the additional information into a header of the message.

31. The computer-readable storage for claim 30 wherein the step of inserting the additional information into the header of the message includes the step of inserting the additional information into one or more invisible fields, which may optionally be ignored by the service provider, within the header.

32. The computer-readable storage for claim 2 wherein the step of modifying the message further includes the step of inserting the additional information into a data portion of the message.

33. The computer-readable storage for claim 32 wherein the step of inserting the additional information into the data portion of the message includes the step of inserting the additional information into one or more invisible fields, which may optionally be ignored by the service provider, in the data portion of the message.

34. The computer-readable storage for claim 2 wherein the additional information is a request for a second set of additional information.

35. The computer-readable storage for claim 2 wherein the additional information is a current location of the service requestor.

36. The computer-readable storage for claim 2 wherein the information contained in said message that is used for determining said additional information is the destination of the message.

37. The computer-readable storage for claim 2 further comprising the step of obtaining the additional information from within a private network that is not accessible to said service provider.

38. The computer-readable storage for claim 2 wherein the additional information is code for execution by said service provider.

39. The computer-readable storage for claim 2 wherein the additional information is billing data.

40. The computer-readable storage for claim 2 further comprising the computer-implemented step of authenticating the service provider.

41. The computer-readable storage for claim 40 wherein the step of authenticating further includes the step of determining whether the service provider is an approved partner.

42. The system of claim 3 wherein the intermediary resides in a secure network that contains information to which the service provider does not have access, and wherein at least some of the information sent from the intermediary to the service provider includes information from within said secure network.

43. The method of claim 1 wherein the first data is user profile information particular to the service requestor and the second data is one of: billing information, location information, or demographic information.

44. The method of claim 1 wherein the first data is one of billing information, location information, or demographic information.

45. The computer-readable storage of claim 2 wherein the first data is user profile information particular to the service requestor and the second data is one of: billing information, location information, or demographic information.

46. The computer-readable storage of claim 2 wherein the first data is one of billing information, location information, or demographic information.

* * * * *

UNITED STATES PATENT AND TRADEMARK OFFICE
CERTIFICATE OF CORRECTION

| | |
|---|---|
| PATENT NO. | : 7,870,293 B2 |
| APPLICATION NO. | : 10/077834 |
| DATED | : January 11, 2011 |
| INVENTOR(S) | : Michael Tso |

It is certified that error appears in the above-identified patent and that said Letters Patent is hereby corrected as shown below:

In the claims:

Claim 3, Column 12, Line 28, delete "and"

Claim 3, Column 12, Line 30, replace "request or" with --requestor--

Signed and Sealed this
Twenty-second Day of March, 2011

David J. Kappos
*Director of the United States Patent and Trademark Office*